(12) United States Patent
Temesi et al.

(10) Patent No.: US 8,848,405 B2
(45) Date of Patent: Sep. 30, 2014

(54) HIGHLY EFFICIENT HALF-BRIDGE DC-AC CONVERTER

(75) Inventors: Ernö Temesi, Nagykovácsi (HU); Michael Frisch, Unterhaching (DE)

(73) Assignee: Vincotech Holdings S.A.R.L., Luxembourg (LU)

( * ) Notice: Subject to any disclaimer, the term of this patent is extended or adjusted under 35 U.S.C. 154(b) by 355 days.

(21) Appl. No.: 13/192,026

(22) Filed: Jul. 27, 2011

(65) Prior Publication Data

US 2012/0033474 A1  Feb. 9, 2012

(30) Foreign Application Priority Data

Jul. 30, 2010 (EP) .................................... 10008009

(51) Int. Cl.
*H02M 7/487* (2007.01)
*H02M 7/483* (2007.01)

(52) U.S. Cl.
CPC .............. *H02M 7/483* (2013.01); *H02M 7/487* (2013.01)
USPC ................................ 363/43; 363/71; 363/131

(58) Field of Classification Search
USPC .......................................... 363/43, 97, 131, 71
See application file for complete search history.

(56) References Cited

U.S. PATENT DOCUMENTS

| | | | |
|---|---|---|---|
| 5,801,936 A * | 9/1998 | Mori et al. | 363/132 |
| 5,851,857 A * | 12/1998 | Kelberlau et al. | 438/134 |
| 5,949,669 A | 9/1999 | Bruckmann et al. | |
| 6,490,185 B1 * | 12/2002 | Yamanaka et al. | 363/98 |
| 2003/0117815 A1 * | 6/2003 | Saada | 363/40 |
| 2005/0105314 A1 * | 5/2005 | Nielsen | 363/132 |
| 2010/0039843 A1 | 2/2010 | Takizawa | |
| 2010/0084922 A1 | 4/2010 | Gollentz et al. | |
| 2011/0193412 A1 * | 8/2011 | Lacarnoy | 307/75 |

FOREIGN PATENT DOCUMENTS

| | | | | |
|---|---|---|---|---|
| BR | 200007365 A | * | 8/2002 | |
| CN | 102739100 A | * | 10/2012 | |
| EP | 1544994 A2 | | 6/2005 | |
| JP | 11262240 A | | 9/1999 | |
| JP | 2002247862 A | | 8/2002 | |
| JP | 200511033 A | | 4/2005 | |
| JP | 2005110336 | | 4/2005 | |
| JP | 2008067566 A | | 3/2008 | |

* cited by examiner

*Primary Examiner* — Harry Behm
(74) *Attorney, Agent, or Firm* — Michael Best & Friedrich (57) ABSTRACT

The invention relates to a DC to AC converter circuit. In particular, the invention relates to a half-bridge inverter for converting a DC to an AC voltage. The half-bridge inverter for converting a DC input voltage to provide an AC output voltage at an output terminal, comprising a first switching circuit connected to at least one input terminal and to the output terminal and configured to provide a high or a low voltage level at the output terminal; a second switching circuit connected to the output terminal and configured to provide a connection to an intermediate voltage level, the intermediate voltage level being between the high and the low voltage level; and wherein the second switching circuit is further connected to the at least one input terminal allowing the second switching circuit to provide the high or the low voltage level at the output terminal.

15 Claims, 4 Drawing Sheets

HIGHLY EFFICIENT HALF-BRIDGE DC-AC CONVERTER

BACKGROUND OF THE INVENTION

The invention relates to a converter circuit for converting a DC input voltage to an AC output voltage. In particular, the invention relates to a half-bridge inverter for converting a DC input voltage to provide an AC output voltage at the output terminal thereof.

These days, there exists a high demand for highly efficient power converters, for instance, for use as solar inverters, in power generators, or as power converters for high speed motor drives or for uninterruptible power supplies. At the same time, it is more and more important to reduce the costs of said power converters by replacing circuits based on the SiC MOS-FET or JFET technology with a standard silicon BJT/MOS-FET/IGBT technology applied to high power applications.

Generally, there are several techniques known in the prior art to improve the overall power efficiency of a power converter employing MOS-FET/IGBT switching elements.

In particular, a highly efficient power converter with MOS-FET/IGBT switching elements is described in "Advantages of NPC Inverter Topologies with Power Modules" by Temesi, Ernö and Frisch, Michael, Power Electronics Europe, Sep. 4, 2009. In particular, this document describes different power converter circuits, some based on a NPC inverter topology, others based on a half-bridge topology. In particular, a proposed half-bridge inverter is shown in FIG. 4.

Figure 4:
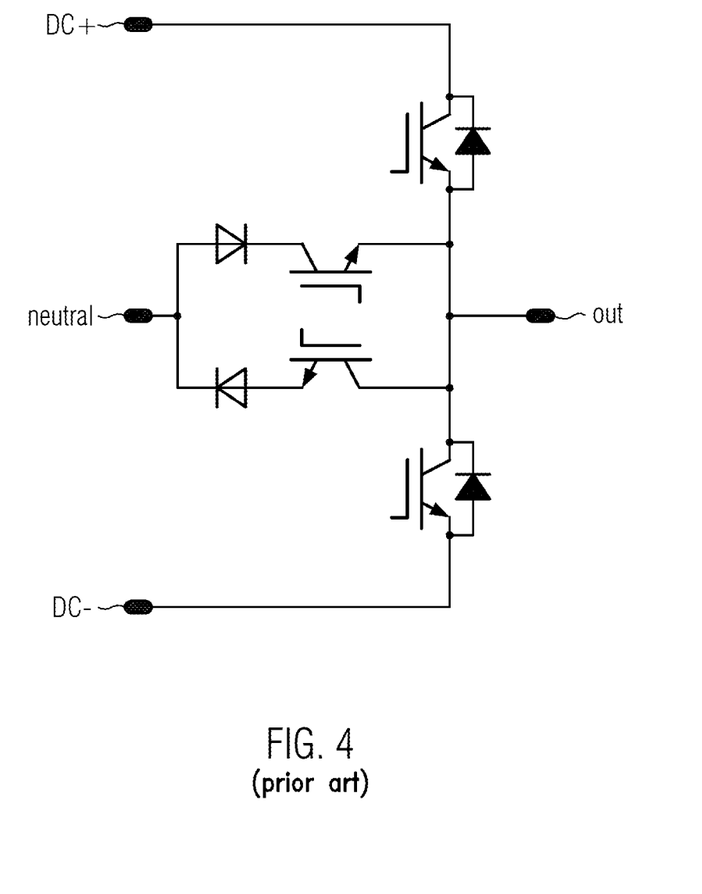
FIG. 4 illustrates a circuit diagram of the half-bridge inverter circuit according to a related embodiment.

The half-bridge inverter, as illustrated in FIG. 4, includes a half-bridge switching stage connected to the DC+ and to the DC− input terminals. By enabling the upper IGBT of the half-bridge switching stage, a positive voltage can be provided at the output terminal OUT. By enabling the lower IGBT of the half-bridge switching stage, a negative voltage can be provided at the output terminal OUT.

In a transition period in between the enabling of the upper and of the lower IGBT, the output terminal may be provided with a neutral potential from the neutral terminal, for instance with ground connection. The connection to the neutral terminal is provided via two IGBTs and two diodes.

Due to the design of the half-bridge switching stage a single IGBT transistor is connecting an input terminal to the output terminal. Accordingly, the conductive losses of the design are small in comparison with an NPC inverter comprising a switching stage with four transistors. However, a single transistor connecting the input and the output terminal requires a higher voltage rating specifying the transistor's voltage blocking capabilities in a non-conducting state. Accordingly, the high voltage rating results in limitations on the switching performance.

For improving the switching performance, it is known to provide a parallel circuit of an IGBT and of a MOS-FET. In particular, a parallel circuit of an IGBT and of a MOS-FET can be configured to assign the static losses to the IGBT and the switching losses to the MOS-FET. Further, a fast switching speed of a MOS-FET is advantageous for reducing the switching losses. Thus, the MOS-FET may be set to carry the current during a low power period or a transition period and the IGBT may be set to carry the majority of the load in a high power period in order to improve the overall efficiency.

Accordingly, the parallel circuit of an IGBT and a MOS-FET may help improving the switching performance of the described half-bridge switching stage. However, the parallel circuit would also be limited to the same high voltage rating as the half-bridge shown in FIG. 4; wherein the necessary high voltage rating introduces a negative effect on the switching performance of MOS-FET as well as the IGBT.

In summary, the known techniques for improving the efficiency of power converters do not meet the requirements of a highly efficient half-bridge inverter in a satisfying manner.

SUMMARY OF THE INVENTION

The object underlying the invention is to improve the efficiency of a power converter, in particular of the above described half-bridge inverter. A further object underlying the invention is to reduce the production cost with respect to the technology employed for the highly efficient power converter.

One embodiment of the invention relates to a half-bridge inverter for converting a DC input voltage to provide an AC output voltage at an output terminal, the half-bridge inverter comprising: a first switching circuit and a second switching circuit. The first switching circuit is connected to at least one input terminal and to the output terminal, the first switching circuit being configured to provide a high or a low voltage level at the output terminal. The second switching circuit is connected to the output terminal, the second switching circuit being configured to provide a connection to an intermediate voltage level, the intermediate voltage level being between the high and the low voltage level. The second switching circuit is further connected to the at least one input terminal allowing the second switching circuit to provide the high or the low voltage level at the output terminal.

An advantage of the invention may result from realizing the additional conducting path connecting the input terminal through the second switching circuit to the output terminal with a different transistor technology. By the invention providing two paths between the input terminal and the output terminal, each path may be realized with different transistors. As different transistor may be optimized for different purposes, realizing each path with different transistors can be used for improved power efficiency.

Further, according to another embodiment of this invention, the second switching circuit is further connected to an intermediate voltage level terminal, the intermediate voltage level terminal being configured to provide the intermediate voltage level. The second switching circuit further comprises at least one third switching circuit which is connected to the at least one input terminal and to at least one internal node, the third switching circuit being configured to provide the high or the low voltage level from the at least one input terminal to the at least one internal node. The second switching circuit also further comprises at least one first switching element configured to control providing the intermediate voltage level from the intermediate voltage level terminal and the high or the low voltage level from the at least one internal node at the output terminal.

Consequently, the invention allows for providing an intermediate voltage level at the output terminal during a time period in between the periods when the half-bridge inverter provides either a high voltage level or a low voltage level. By connecting the output to an intermediate voltage level terminal through a switching element with only half of the DC input voltage level as voltage rating, the dynamic losses can be significantly reduced.

Further, each of the two connecting paths is separately switchable. Thus, a delayed/early switching may be realized for one of the two switching circuits. In particular, the second switching circuit may be turned on at the same time as the first switching circuit and turned off with a delay in relation to the first switching circuit. This may allow for the advantageous modification of the path through the second switching circuit being turned "on" earlier and being turned "off" later than the path through the first switching circuit.

A delay circuit may be implemented by postponing predefined signal transitions of the switching signal for instance by introducing a static delay on the "off" signal transition.

According to another embodiment of this invention, the second switching circuit further comprising at least one first diode connected between the intermediate voltage level terminal and the at least one internal node, and wherein the at least one first diode is configured to block current from flowing between the at least one input terminal and the intermediate voltage level terminal.

By providing a first diode to connect the internal node to the intermediate voltage level terminal, namely the ground potential, the diode may determine the voltage level at the internal node during the time period in between both half wave periods. Thereby, a lower transistor voltage rating of the transistors included in the second switching circuit is required, for instance a voltage rating corresponding to at least half the DC input voltage level.

Further, the diode prevents current from flowing between the input terminal and the intermediate voltage level terminal without the need for an active control, thereby reducing the complexity of a driver.

According to another embodiment of this invention, the at least one third switching circuit comprises a metal oxide semiconductor field-effect transistor connected to the at least one input terminal and to the at least one internal node.

Further, according to another embodiment of this invention, the at least one first switching element is an insulated gate bipolar transistor.

According to another embodiment of this invention, the at least one third switching circuit comprises a series circuit of a second diode and a metal oxide semiconductor field-effect transistor. The first switching element is a metal oxide semiconductor field-effect transistor.

Further, according to another embodiment of this invention, the first switching circuit comprises at least one insulated gate bipolar transistor and the second switching circuit comprises at least one metal oxide semiconductor field-effect transistor.

An isolated gate bipolar transistor (IGBT) benefits from an advantageously low saturation voltage $V_{CE}(sat)$ compared to a metal oxide semiconductor field-effect transistor (MOS-FET) of a similar transistor rating.

Accordingly, providing an IGBT in the first switching circuit allows the switching of the high or low voltage level with low conducing losses, whereas the provision of a MOS-FET in the second switching circuit enables the switching of the second conducting path with high speed and, hence, with reduced dynamic losses.

Further, according to another embodiment of this invention, the second switching circuit further comprises at least one reverse blocking insulated gate bipolar transistor connecting the intermediate voltage level terminal and the output terminal in parallel with the at least one first diode and the at least one first switching element.

A reverse blocking insulated gate bipolar transistor (RBIGBT) allows for simultaneously switching the intermediate voltage level and the connection via the diode and the first switching element.

By providing two RBIGBTs, the conduction losses resulting from the connection through the diode and the first switching element can be reduced. The connection through the diode and the first switching element includes two PN-junctions whereas the RBIGBT only includes a single PN-junction. Thus, the RBIGBT provides for reduced conduction losses whereas the switching losses are determined by the diode.

Further, as the RBIGBTs may only be switched at a zero voltage level, there will be no reverse recovery current in the RIGBT which might increase the switching losses.

According to another embodiment of this invention, the first switching circuit includes at least one cascode of an emitter switched bipolar transistor and of an metal oxide semiconductor field-effect transistor, the at least one cascode being connected between the at least one input terminal and the output terminal for providing the high or the low voltage level at the output terminal. The second switching circuit further comprises at least one second switching element connected between the at least one internal node and the base of the emitter switched bipolar transistor for controlling the provision of the high or the low voltage level by the at least one cascode at the output terminal.

In this embodiment of the invention, an advantageous half-bride design employing an emitter switched bipolar transistors is further improved with the half-bridge inverter comprising a neutral point switching circuit (second switching circuit) allowing a faster switching of the DC+ and DC− input voltage level than the half-bridge inverter circuit. Thereby, the switching losses are further reduced.

Further, according to another embodiment of this invention, the at least one first switching element is either a metal oxide semiconductor field-effect transistor or a insulated gate bipolar transistor. The at least one third switching circuit comprises a metal oxide semiconductor field-effect or an insulated gate bipolar transistor connected to the at least one input terminal and to the at least one internal node. The at least one second switching element is a metal oxide semiconductor field-effect transistor.

Accordingly, the transistors of the neutral point switching circuit (second switching circuit) can be selectively optimized for a faster switching speed by providing MOS-FET transistors or for reducing the conduction losses by providing IGBT transistors.

According to another embodiment of this invention, the half-bridge inverter comprises two input terminals for receiving the high voltage level and the low voltage level as the DC input voltage, wherein each of the two input terminals is connected via a capacitor to the intermediate voltage level terminal.

Further, according to another embodiment of this invention, the first switching circuit is configured to provide an AC output voltage from the high and the low voltage level by alternately switching a connection between one of the two input terminals and the output terminal.

According to another embodiment of this invention, the first switching circuit includes at least one transistor with a transistor rating of at least the DC input voltage level, and the second switching circuit includes at least one transistor with a transistor rating of at least a voltage level corresponding to the difference between the voltage level at the at least one input terminal and the intermediate voltage level terminal.

By realizing the transistors comprised in the first switching circuit with a voltage level rating of the DC input voltage level and the transistors comprised in the second switching circuit with a lower voltage level rating then the DC input voltage level, for instance, at least half the DC input voltage level, the switching performance of the second switching circuit can be optimized and the switching losses reduced.

Further, according to another embodiment of this invention, the first switching element includes a transistor with a transistor rating of at least a voltage level corresponding to the difference between the voltage level at the at least one input terminal and the intermediate voltage level terminal.

According to another embodiment of this invention, the driving method for the half-bridge inverter of the invention comprising the steps of turning on the first switching element and remaining the first switching element turned on for the period of providing the positive or negative half wave, turning on the third switching circuit enabling the DC input voltage from the at least one input terminal to be conducted via the third switching circuit and first switching element to the output terminal, and turning on the at least one second switching element and the metal oxide semiconductor field-effect transistor.

BRIEF DESCRIPTION OF THE DRAWINGS

For a better understanding of the present invention, same will be explained in the following based on the embodiments shown in the figures. Corresponding parts are given corresponding reference numerals and terms. Furthermore, those features or combinations of features which show or describe different embodiments may form separate inventive solutions in themselves. The invention will now be described by way of example with reference to the drawings, wherein.

DETAILED DESCRIPTION

Figure 1:
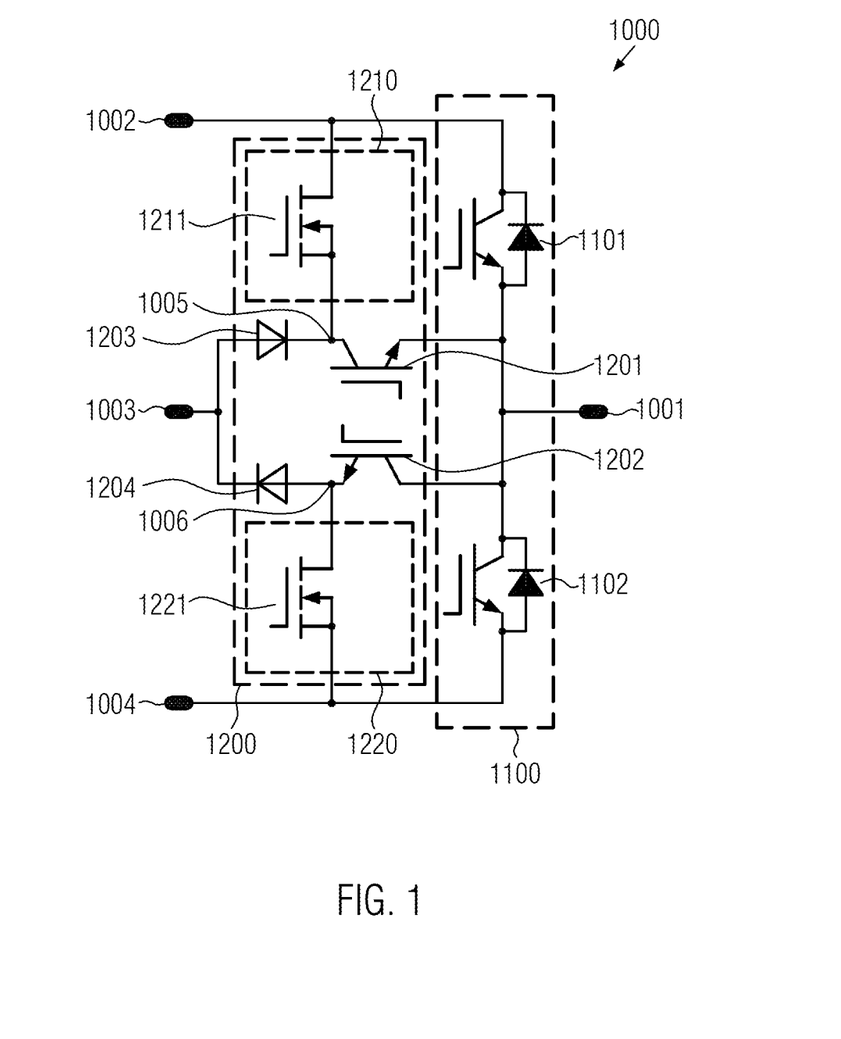
FIG. 1 illustrates a circuit diagram of the half-bridge inverter circuit according to an exemplary embodiment of the invention.

Referring to FIG. 1, a circuit diagram of the half-bridge inverter circuit 1000 according to an exemplary embodiment of the invention is shown. For instance, the half-bridge inverter circuit may be used for converting a DC to an AC voltage. For this purpose, the half bridge inverter 1000 includes an output terminal 1001 and may be supplied through at least one input terminal 1002, 1004 with a DC input voltage level.

In the embodiment shown in FIG. 1, the DC input voltage is connected between the DC+ input terminal 1002 and the DC− input terminal 1004. Further, an intermediate voltage level is provided via an intermediate voltage level terminal 1003. Specifically, the intermediate voltage level terminal 1003 may be connected to a ground voltage level. Accordingly, a potential difference of half the DC− input voltage level is provided between the terminals 1002 and 1003 as well as the terminals 1003 and 1004.

In other words, due to the provision of the DC input voltage to input terminals 1002 and 1004 and an intermediate voltage level input terminal 1003, the half bridge inverter circuit is enabled to switch an output signal corresponding to a positive half wave by enabling a connection between the input terminal 1002 and the output terminal 1001 and to switch an output signal corresponding to a negative half wave by enabling a connection between the input terminal 1004 and the output terminal 1001.

In more particular, the half-bridge inverter circuit 1000 comprises a half-bridge switching circuit (first switching circuit) 1100 and a neutral point switching circuit (second switching circuit) 1200.

For sequentially providing a positive and a negative half wave at the output terminal (AC), the half-bridge switching circuit is configured to alternately connect the input terminal 1002 and the input terminal 1004 to the output terminal 1001. For this purpose, the half-bridge switching circuit 1100 comprises an insulated gate bipolar transistor (IGBT) 1101 connecting the input terminal 1002 and the output terminal 1001, and an IGBT 1102 connecting the input terminal 1004 and the output terminal 1001.

In particular, the IGBTs 1101 and 1102 require a voltage rating of at least the full DC input voltage level wherein the voltage rating specifies the transistor's voltage blocking capabilities in a non-conducting state. For instance, to provide the positive half wave at the output terminal, the IGBT 1101 is set conducting. During this period the IGBT 1102 will see the full DC input voltage, as the DC+ input voltage level is provided to output terminal 1001 and the IGBT 1102 is also connected to the input terminal 1004 with a DC− input voltage level. Accordingly, the IGBT 1102 requires a voltage rating of at least the full DC input voltage. Same applies to the IGBT 1101.

For providing an intermediate voltage level, namely a neutral voltage level, at the output terminal 1001 the half-bridge inverter 1000 further comprises the neutral point switching circuit 1200 connecting the intermediate voltage level terminal 1003 and the output terminal 1001.

In more detail, the neutral point switching circuit 1200 provides two connections between the intermediate voltage level terminal 1003 and the output terminal 1001. A first connection through a transistor 1201 and a diode 1203 is capable of conducting a current from the intermediate voltage level terminal 1003 to the output terminal 1001. A second connection through a transistor 1202 and a diode 1204 is capable of conducting a current from the output terminal 1001 to the intermediate voltage level terminal 1003.

The two connections ensure the operation of the half-bridge inverter at reactive power. By switching the two transistors 1201 and 1202 in phase with the respective transistors 1101 and 1102 of the first switching circuit, a freewheeling current can be propagated between the intermediate voltage level terminal 1003 and the output terminal 1001.

For instance, during a positive half wave, transistors 1201 and 1101 are enabled at the same time whereas transistors 1202 and 1102 are completely inactive. After the time of providing the positive half wave, the transistor 1101 is turned off while transistor 1201 is maintained in a conducting state. Maintaining transistor 1201 conductive enables a freewheeling current to flow from the intermediate voltage level terminal 1003 through diode 1203 and transistor 1201 to the output terminal 1001. The transistor 1201 is kept in a conducting state until the voltage level of the output terminal 1001 becomes negative.

Further, during a negative half wave, transistors 1202 and 1102 are enabled at the same time whereas transistors 1201 and 1101 are completely inactive. After the time of providing the negative half wave, the transistor 1102 is turned off while transistor 1202 is maintained in a conducting state. Maintaining transistor 1201 conductive enables a freewheeling current to flow from the output terminal 1001 through transistor 1202 and diode 1204 to the intermediate voltage level terminal 1003. The transistor is kept in a conducting state until the voltage level at the output 1001 becomes positive. The transistors 1201 and 1202 may be provided as insulated gate bipolar transistors (IGBTs).

Further, the neutral point switching circuit 1200 includes an additional connection to at least one of the input terminals 1002 and 1004.

As shown in FIG. 1, the neutral point switching circuit 1200 comprises at least one third switching circuit 1210 and 1220 connecting an internal node 1005 and 1006 to one of the input voltage terminals 1002 and 1004. Specifically, the internal node 1005 is the node connecting the diode 1203 and the transistor 1201 between the intermediate voltage level terminal 1003 and the output terminal 1001. This node 1005 is additionally connected by the third switching circuit 1210 to the input terminal 1002. The internal node 1006 is the node connecting the diode 1204 and the transistor 1203 between the intermediate voltage level terminal 1003 and the output terminal 1001. This node 1006 is additionally connected by the third switching circuit 1220 to the input terminal 1004.

Due to the connection to the input terminals 1002 and 1004, the third switching circuit 1210 and 1220 is capable of switching an input voltage provided at input terminals 1002 or 1004 through an alternative connection, namely via the neutral point switching circuit 1200 to the output terminal 1001.

Accordingly, the neutral point switching circuit 1200 is not only capable of providing an intermediate voltage level but also capable of providing the high and/or the low voltage level at the output terminal 1001. In this respect, the neutral point switching circuit is in the following referred to as second switching circuit 1200.

As illustrated in FIG. 1, the third switching circuit 1210 comprises transistor 1211 and the third switching circuit 1220 comprises transistor 1221. The transistors 1211 and 1221 may be provided as metal oxide semiconductor field-effect transistors (MOS-FETs). By enabling the two transistors 1211 and 1201, a connection is provided between the input terminal 1002 and the output terminal 1001. Similarly, by enabling the two transistors 1221 and 1202, a connection is provided between the input terminal 1004 and the output terminal 1001.

Additionally, diodes 1203 and 1204 prevent current from flowing between each of the input terminals 1002 and 1004 and the intermediate voltage level terminal 1003. For example, when enabling the two transistors 1211 and 1201, the internal node 1005 is at a high voltage level. Consequently, the diode 1203, which is connecting the internal node 1005 to the intermediate voltage level terminal 1003, is reversely biased thereby blocking current from flowing from the internal node 1005 to the intermediate voltage level terminal 1003. In a similar manner, the diode 1204 blocks current from flowing from the intermediate voltage level terminal 1003 to the input terminal 1004.

The transistors 1211 and 1201 as well as the transistors 1202 and 1221 only require to be specified for a voltage rating of at least half the DC input voltage level, the voltage rating defining each transistor's voltage blocking capabilities in a non-conducting state. When the transistors 1211 and 1201 and transistors 1202 and 1221 are set non-conducting, the internal nodes 1005 and 1006 are maintained at a voltage level of approximately the intermediate voltage level. Irrespective of the voltage level at the output terminal 1001 each of the transistors 1211, 1201 and 1202, 1221 is only subject to an voltage level lower than the full DC input voltage, namely the difference of either the DC+ or the DC− voltage level and the intermediate voltage level.

Accordingly, the transistors 1201, 1202, 1221 and 1221 only require a voltage rating of at least half the DC input voltage level. In contrast, the IGBTs 1101 and 1102 of the half-bridge switching stage need to be specified for voltage rating of at least the full DC input voltage level.

Consequently, the high or low voltage level can be provided through two parallel connections, a first through either transistor 1101 or transistor 1102 (with a high voltage rating) and a second through the respective transistors 1201 and 1211 or the transistors 1202 and 1221 (with a low voltage rating).

In the following an exemplary switching cycle of the half bridge inverter of FIG. 1 for providing a positive half wave and thereafter a negative half wave will be described.

For outputting a positive half wave, the DC+ input voltage level is provided at the output terminal 1001. For this purpose, the half-bridge inverter circuit, shown in FIG. 1, enables two parallel connections, a first connection through IGBT 1101 and a second connection through MOS-FETs 1211 and IGBT 1201.

In particular the MOS-FET 1211 has a lower voltage rating and therefore is switching faster such that the turn-on losses are mainly assigned to the MOS-FET 1211. During the positive half wave MOS-FET 1201 is continuously turned on.

With a small delay the IGBT 1101 takes over the conducting current to the output terminal 1001 due to its much lower saturation voltage $V_{CE}(sat)$ compared to connection through IGBT 1201 and the MOS-FET 1211. Accordingly, the static losses are assigned to the IGBT 1101.

For turning off the connections providing a high voltage level at the output terminal 1001, the IGBT 1101 is first set to a non-conducting state such that the connection through IGBT 1201 and the MOS-FET 1211 will take over the current and thereafter, at least the MOS-FET 1211 is turned off.

For providing a connection to the intermediate voltage level terminal 1003, the IGBT 1201 is maintained in a conductive state after the IGBT 1101 is disabled until the voltage level at the output terminal becomes negative.

For outputting a negative half wave, the DC− input voltage level is provided at the output terminal 1001. For this purpose, the half-bridge inverter circuit shown in FIG. 1 enables the two parallel connections, a first connection through IGBT 1102 and a second connection through IGBT 1202 and the MOS-FET 1221.

In particular, MOS-FET 1221 has a lower voltage rating and therefore is switching faster, the turn-on losses are mainly assigned to the MOS-FET 1221. During the negative half wave MOS-FET 1202 is continuously turned on. With a small delay the IGBT 1102 will take over the conducting current to the output terminal 1001 due to its much lower saturation voltage $V_{CE}(sat)$ compared to connection through the IGBT 1202 and the MOS-FET 1221. Accordingly, the static losses are assigned to the IGBT 1102.

For turning off the connections providing a low voltage level at the output terminal 1001, the IGBT 1102 is first set to a non-conducting state such that the connection through the IGBT 1202 and the MOS-FET 1221 will take over the current and thereafter, at least the MOS-FET 1221 is turned off.

For providing a connection to the intermediate voltage level terminal 1003, at least the MOS-FET 1201 is set conducting Consequently, the half-bridge inverter as shown in FIG. 1 is highly efficient similarly to converters employing SiC MOS-FET/JFET based circuits. Yet, the half-bridge inverter as shown in FIG. 1 achieves the high efficiency with low cost standard Si MOS-FET/IGBT circuit extended to high power levels.

In particular, the advantages results from the parallel switching of two connections via an IGBT and an MOS-FET, the MOS-FET of a voltage rating about half the voltage rating of the IGBT. By paralleling a single high voltage IGBT having a low saturation voltage with a fast switching component, namely the MOS-FET 1211 or 1221, the switching losses and the static losses can be assigned to an efficient transistor path. Specifically, the connection through the single high voltage IGBT has only one PN-junction for the current to flow through reducing the conduction losses to a minimum.

Further, the IGBTs 1201 and 1202 only require switching at a low frequency, namely the frequency of the output signal, for instance 50 Hz.

Figure 2:
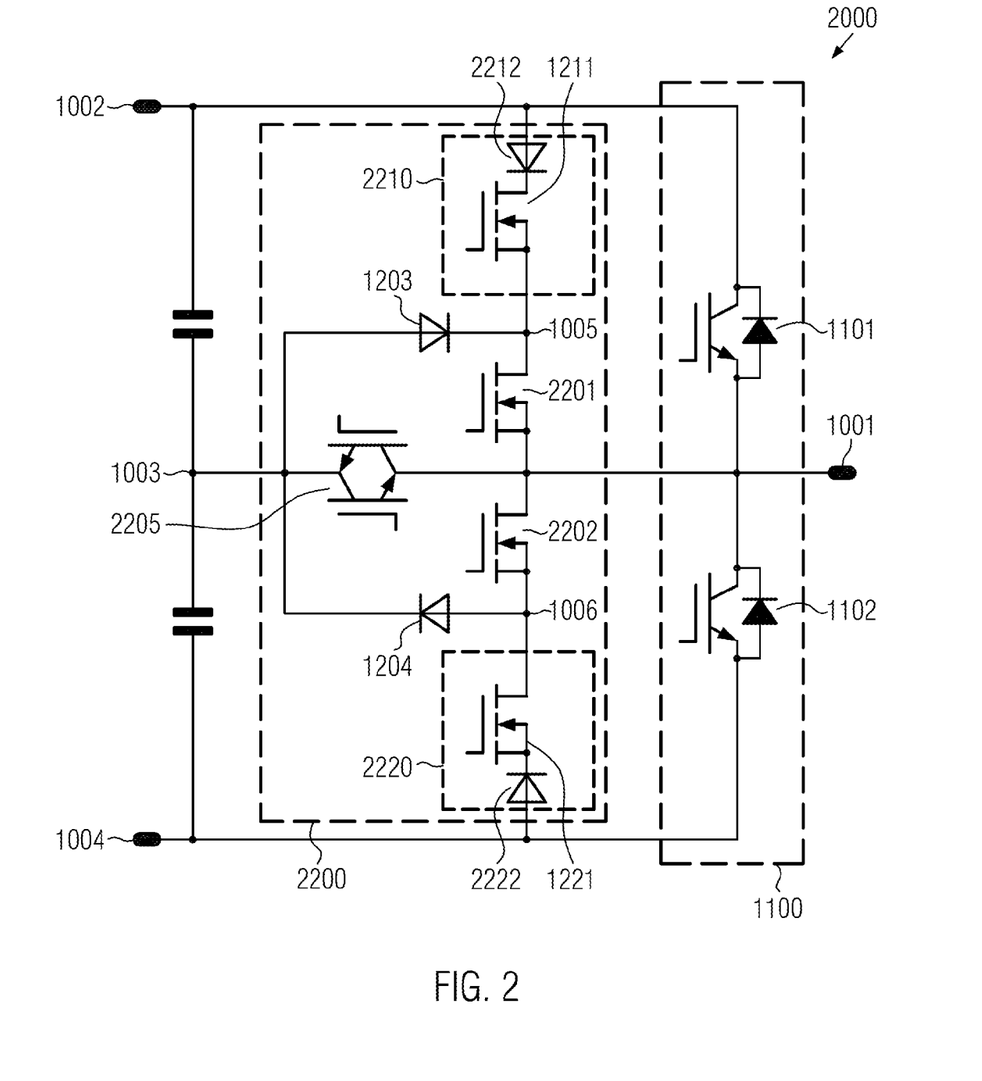
FIG. 2 illustrates a circuit diagram of the half-bridge inverter circuit according to another exemplary embodiment of the invention.

Referring now to FIG. 2, a circuit diagram of the half-bridge inverter according to another exemplary embodiment of the invention is illustrated.

The half-bridge inverter of FIG. 2 comprises a half-bridge switching circuit 1100 and second switching circuit 1200.

Further, each of the input terminals 1002 and 1004 is connected via a capacitor to the intermediate voltage level terminal 1003. Accordingly, the half-bridge switching circuit does not rely on the provision of an externally supplied intermediate voltage level as in the embodiment regarding FIG. 1. Alternatively, the terminal 1003 may still be connected to an external neutral point or ground potential in order to provide an AC voltage with the intermediate voltage level corresponding to a neutral voltage level.

In comparison with FIG. 1, the half-bridge inverter of FIG. 2 further comprises a modified second switching circuit 2200.

During the switching of the intermediate voltage level at reactive power, a freewheeling current is flowing in the embodiment illustrated in FIG. 1 through two PN-junctions, namely the MOS-FET's and the diode's PN-junction. In order to reduce the conduction losses, the half-bridge inverter according to the embodiment shown in FIG. 2 provides two reverse blocking insulated gate bipolar transistors (RBIGBT) 2205 for bypassing the freewheeling current between the output terminal 1001 and the intermediate voltage level terminal 1003.

Accordingly, the second switching circuit 2200 includes at least one RBIGBT connecting the intermediate voltage level terminal 1003 and the output terminal 1001 in parallel with the at least one first diode 1203, 1204 and the at least one first switching element 1201, 1202. In particular, two RBIGBTs 2205 are connecting the intermediate voltage terminal and the output voltage terminal enabling the free wheeling current to flow in either direction.

Accordingly, for providing the intermediate voltage level, the two RBIGBTs 2205 are switched in parallel with the connection through the first diode 1203, 1204 and the first switching element 1201 and 1202. Thereby, the conduction losses are mainly assigned to the RBIGBTs 2205. A connection through a diode 1203, 1204 and a first switching element 1201, 1202 has two PN-junctions whereas a RBIGBT only has one PN-junction. Accordingly, by enabling both connections in parallel, the conduction losses are determined by the low saturation voltage of a RBIGBT 2205 and the switching losses are assigned to the diode 1203 or 1204.

Further, as the RBIGBTs 2205 may only be switched at a zero voltage level, there will be no reverse recovery current in the RIGBT preventing from a further increase of the switching losses.

Additionally, the embodiment illustrated in FIG. 2 realizes the first switching element 1201 or 1202 as metal oxide semiconductor field-effect transistors. Thereby, a fast switching of the intermediate voltage level can be guaranteed also resulting in a highly efficient switching performance at reactive load.

As shown in FIG. 2, each of the third switching circuits 2210, 2220 is realized as a series circuit of a second diode 2212, 2222 and a MOS-FET 1211, 1221. Such a diode 2212, 2222 in series with the MOS-FET 1211, 1221 will avoid reverse current through the MOS-FET 1211, 1221 at reactive power which might cause reverse recovery losses in the MOS-FET 1211, 1221 at turn on.

Figure 3:
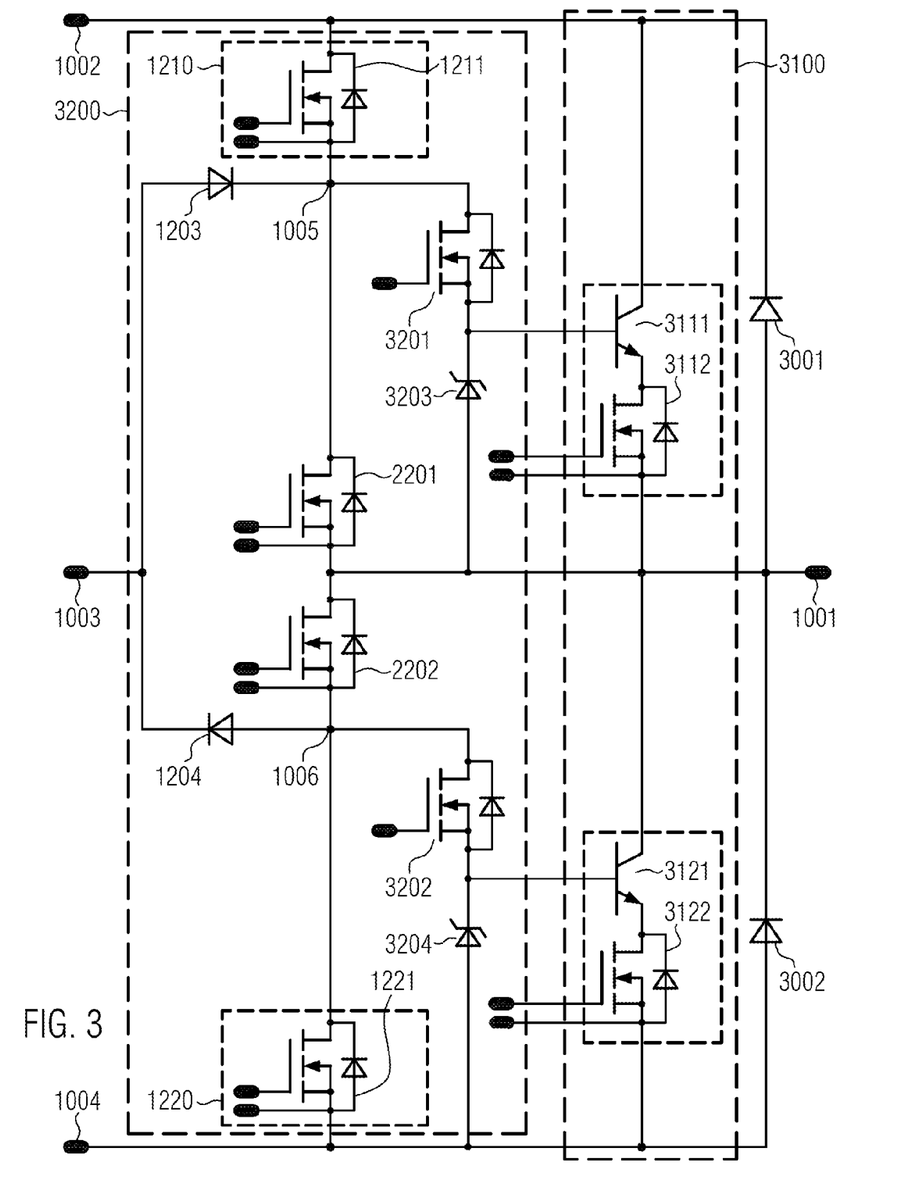
FIG. 3 illustrates a circuit diagram of the half-bridge inverter circuit according to another exemplary embodiment of the invention.

Referring now to FIG. 3, a circuit diagram of the half-bridge inverter 3000 according to another exemplary embodiment of the invention is shown.

The half-bridge inverter 3000 as shown in FIG. 3 includes a half-bridge switching circuit (first switching circuit) 3100 using an emitter switched bipolar transistor. In particular, the half-bridge switching circuit 3100 is provided with a cascode formed of a bipolar junction transistor 3111 or 3121, (which is also named emitter switched bipolar transistor) and a MOS-FET 3112 or 3122 connected between the at least one input terminal 1002, 1004 and the output terminal 1001. Alternately, a monolithic design of an emitter switched bipolar transistor may be employed. Each of the emitter switched bipolar transistors requires a voltage rating of at least the full DC input voltage level.

The half-bridge switching circuit 3100 of the exemplary embodiment shown in FIG. 3 employs two cascode circuits, each with a bipolar junction transistor 3111 or 3121 and a MOS-FET 3112 or 3122. The first cascode, formed of bipolar junction transistor 3111 and MOS-FET 3112, is connected between input terminal 1002 and the output terminal 1001 to provide a high voltage level at the output terminal. The second cascode, formed of bipolar junction transistor 3121 and MOS-FET 3122, is connected between input terminal 1004 and the output terminal 1001 to provide a low voltage level at the output terminal.

In particular, an emitter switched bipolar transistor combines the advantages of a high voltage rating, a low saturation voltage $V_{CE}(sat)$ with a fast switching speed, the switching speed being comparable to that of a MOS-FET transistor. Accordingly, by employing the emitter switched bipolar transistors, the power consumption of the half-bridge switching circuit can be reduced.

In particular, the low saturation voltage $V_{CE}(sat)$ of the emitter switched bipolar transistor result in a reduction of the static losses. Additionally, the faster switching speed of the emitter switched bipolar transistor leads to improvements regarding the dynamic/switching losses.

In the invention, the half-bride design using the emitter switched bipolar transistors is further improved by the half-bridge inverter comprising a neutral point switching circuit (second switching circuit) 3200 allowing a faster switching of the DC+ and DC− input voltage level than by the half-bridge inverter circuit 3100 alone. Thereby, the switching losses are further reduced.

The neutral point switching circuit 3200 includes—in addition to the connection provided by the half-bridge switching circuit 3100—a connection between the at least one of the input terminals 1002 and 1004 and the output terminal 1001. In particular, the neutral point switching circuit 3200 comprises at least one third switching circuit 1210 and 1220 connecting an internal node 1005 and 1006 to one of the input terminals 1002 and 1003. Specifically, the internal node 1005 is the node connecting the diode 1203 and the transistor 2201, the internal node 1005 also being connected via the third switching circuit 1210 to the input terminal 1002. The internal node 1006 is the node connecting the diode 1204 and the transistor 2202, where internal node 1006 is also connected via the third switching circuit 1220 to the input terminal 1004.

A positive voltage level of the input terminal 1002 can be provided by the third switching circuit 1210 to the internal node 1005 and further forwarded by transistor 2201 to the output terminal 1001. Similarly, a negative voltage level of the input terminal 1004 can be provided by the third switching circuit 1220 to the internal node 1006 and further forwarded by transistor 2202 to the output terminal 1001.

In this embodiment, each of the third switching circuits 1210 and 1220 is illustrated employing MOS-FETs, namely transistors 1211 and 1221. However, some of the transistors of the third switching circuits 1210 and 1220 may also be realized as an IGBT. Same also applies for the at least one first switching element 2201, 2202 also comprised in the neutral point switching circuit 3200.

In the exemplary embodiment shown in FIG. 3, the neutral point switching circuit 3200 includes at least one second switching element 3201 and 3202 for controlling the base of the respective one of the at least one bipolar junction transistor 3111 and 3121 of the half-bridge switching circuit 3100 Accordingly, by switching element 3201 and 3202 controlling the bipolar junction transistor 3111 and 3121, the bipolar junction transistor 3111, 3121 can be enabled providing the high and the low voltage level.

In particular, the second switching element 3201 is connected between the intermediate node 1005 and the base of the bipolar junction transistor 3111 for providing a high voltage level of the internal node 105 to the base of the bipolar junction transistor 3111. Similarly, the transistor 3202 is connected between the intermediate node 1006 and the base of the bipolar junction transistor 3121 for providing a low voltage level of the internal node 1006 to the base of the bipolar junction transistor 3121.

Further, the neutral point switching circuit (second switching circuit) 3200 includes—similar to the neutral point switching circuit 1200 of the first embodiment—two connections between the intermediate voltage level terminal 1003 and the output terminal 1001. The first connection is provided via first switching element 2201 and diode 1203 for discharging a negative voltage level of the output terminal. The second connection is provided via first switching element 2202 and diode 1204 for discharging a positive voltage level of the output terminal.

The neutral point switching circuit (second switching circuit) 3200 provides multiple connection between the at least one input terminal 1002 and 1004 and the output terminal 1001. A first connection is provided via the at least one third switching circuit 1210 and 1220 and the at least one first switching element 2201 and 2202—similar to the circuit of the first and the second embodiment. Furthermore, a different connection is provided for carrying the base current for the at least one emitter switched bipolar transistor 3111 and 3121, namely via switching elements 1211, 3201, 3111 and 3112 or via switching elements 2202, 3202, 3121 and 3122.

For providing a positive half wave, the DC+ input voltage level is provided at the output terminal 1001. For this purpose, the half-bridge inverter circuit, as shown in FIG. 3, enables three different connections, first connection via switching elements 1211 and 2201, a second connection via switching elements 1211, 3201, 3111 and 3112, and a final connection via MOS-FET 3112 and bipolar junction transistors 3111.

In particular, the turn-on control sequence for providing the positive half wave is performed in three steps:
  a) the switching element 2201 is turned on and remains turned on for the period of providing the positive half wave; as a consequence, the output terminal 1001 remains at the intermediate voltage level;
  b) the switching element 1211 is turned on, which will enable the DC+ voltage level from the input terminal 1002 to be conducted via switching element 2201 and switching element 1211 to the output terminal 1001; as a consequence, the output terminal 1001 is at a high voltage level;
  c) the switching element 3201 and the switching element 3112 are turned on; as a consequence, the bipolar junction transistors 3111 also turns on.

Further, the turn-off control sequence for switching from a positive half wave to an intermediate voltage level is performed in the following two steps:
  a) the switching element 3112 and the switching element 3201 are turned off; as a consequence, a current is flowing from the base of the bipolar junction transistor 3111 and in reverse direction through switching element 3201 and through switching element 2201, the bipolar junction transistor 3111 will turn off and the current is taken over by the switching elements 1211 and 2201;
  b) after awaiting a delay of some 100 ns the switching element 1211 is turned off; as a consequence, the voltage level at the output terminal 1001 falls to the intermediate voltage level, namely to a ground potential.

The time point of switching off of the switching element 3201 as in the above-described step (a) does not need to coincide with the time point of switching off the switching element 3112 and may also take place later. A later switching off of the switching element 3201 allows for an active rectification of the output signal waveform. Nevertheless, the switching element 3201 must be switched off before step (b) of the turn-off control sequence.

Upon change between the positive and negative half wave, the switching elements for providing the high voltage level are turned off, namely switching elements 1211, 2201, 3201, 3112. Thereafter, the modulation of the output voltage is performed via switching elements 2202, 1221, 3202 and 3122 for providing the low voltage level. The change between the enabling/disabling of switching element 2201 and the disabling/enabling of switching element 2202 is triggered at the time point when the output voltage (not the output current) changes between a positive/negative voltage level.

A special case results from the half-bridge inverter driving a reactive load and, hence, operating at reactive power, namely when voltage and current have a different polarity. In the transition period of the output voltage changing between positive and negative, only one of the two switching elements 2201 and 2202 is enabled, namely the one switching element corresponding to the direction of the current. Thereby, the flow of the current at reactive power can flow through one of the two connections between the intermediate input terminal 1003 and the output terminal 1001, namely via diode 1203 and switching element 2201 or via diode 1204 and switching element 2202.

For providing a negative half wave, the DC− input voltage level is provided at the output terminal 1001. For this purpose, the half-bridge inverter circuit, as shown in FIG. 3, enables three different connections, first connection via switching elements 1221 and 2202, a second connection via switching elements 2202, 3202, 3121 and 3122, and a final connection via MOS-FET 3122 and bipolar junction transistors 3121.

In particular, the turn-on control sequence for providing the negative half wave is performed in three steps:
  a) the switching element 2202 is turned on and remains turned on for the period of providing the negative half wave; as a consequence, the output terminal 1001 remains at the intermediate voltage level;
  b) the switching element 1221 is turned on, which will enable the DC− voltage level from the input terminal 1004 to be conducted via switching element 1221 and switching element 2202 to the output terminal 1001; as a consequence, the output terminal 1001 is at a high voltage level;

c) the switching element 3202 and the switching element 3122 are turned on; as a consequence, the bipolar junction transistors 3121 also turns on.

Further, the turn-off control sequence for switching from a negative half wave to an intermediate voltage level is performed in the following two steps:

a) the switching element 3122 and the switching element 3202 are turned off; as a consequence, a current is flowing from the base of the bipolar junction transistor 3121, in reverse direction through switching element 3202 and through switching element 1221, the bipolar junction transistor 3121 will turn off and the current is taken over by the switching elements 2202 and 1221;

b) after awaiting a delay of some 100 ns the switching element 1221 is turned off; as a consequence, the voltage level at the output terminal 1001 falls to the intermediate voltage level, namely to a ground potential.

The time point of switching off of the switching element 3202 as in the above-described step (a) does not need to coincide with the time point of switching off the switching element 3222 and may also take place later. A later switching off of the switching element 3202 allows for an active rectification of the output signal waveform. Nevertheless, the switching element 3202 must be switched off before step (b) of the turn-off control sequence.

Further, the half-bridge inverter circuit 3200 is shown in FIG. 3 with two additional diodes 3001 and 3002, one diode 3001 being connected reversely biased between the input terminal 1002 and the output terminal 1001 and the other diode 3002 being connected reversely biased between the output terminal 1001 and the input terminal 1004.

When the half-bridge inverter circuit is driving a real load, there is no current flowing through any of the two diodes 3001 and 3002. However, at reactive power, the two diodes 3001 and 3002 allow a freewheeling current to flow in a direction opposing the potential generated at the output terminal 1001.

Additionally, the half-bridge inverter circuit 3200, as shown in FIG. 3, provides two Zener diodes 3203 and 3204 for protection of the respective emitter switched bipolar transistors 3111 and 3121.

In particular, Zener diode 3203 is connected reversely biased between the base of the bipolar junction transistor 3111 and the output terminal 1001. Accordingly, if the potential provided by transistor 3201 to the base of the bipolar junction transistor 3111 exceeds the predefined breakdown voltage of the Zener diode 3203, a breakdown current flows from the transistor 3201 to the output terminal 1001. When the bipolar junction transistor 3111 is turned off, the Zener diode 3203 provides a parallel conducting path to the emitter-base or the emitter-collector junction of the bipolar junction transistor 3111 e.g. to protect the bipolar junction transistor 3111 at reactive load.

Further, Zener diode 3204 is connected reversely biased between the base of the bipolar junction transistor 3121 and the output terminal 1001. Accordingly, if the potential provided by transistor 3202 to the base of the bipolar junction transistor 3111 exceeds the predefined breakdown voltage of the Zener diode 3204, a breakdown current flows from the transistor 3202 to the input terminal 1004. When the bipolar junction transistor 3121 is turned off, the Zener diode 3204 provides a parallel conducting path to the emitter-base or the emitter-collector junction of the bipolar junction transistor 3121 e.g. to protect the bipolar junction transistor 3121 at reactive load.

The diodes 3001 and 3002, although not shown in FIG. 1 and FIG. 2, may also be advantageously employed in the first and second embodiment.

As apparent from the description of the various embodiments of the invention provided above, the half-bridge inverter of the invention is highly efficient similarly to converters employing SiC MOS-FET/JFET based circuits. Yet, the half bridge inverter of the invention achieves the high efficiency with a low cost standard Si MOS-FET/IGBT/BJT circuit extended to high power levels.

The high efficiency of the half-bridge inverter of the invention result from the parallel switching of an IGBT or emitter switched bipolar transistor and a MOS-FET, the MOS-FET only with half the voltage rating of the IGBT. By paralleling a single high voltage IGBT having a low saturation voltage with a fast second switching circuit, namely of MOS-FETs, the switching losses and the static/conduction losses can be assigned to an efficient transistor path. Specifically, the connection through the single high voltage IGBT has only one PN-junction for the current to flow through reducing the conduction losses to a minimum. Alternatively, an emitter switched bipolar transistor provides for a low saturation voltage $V_{CE}(sat)$. In combination with a paralleled second switching circuit with a higher switching speed, the switching losses and the static/conduction losses can be assigned to the more efficient transistor path. Accordingly, also with the emitter switched bipolar transistor design, the overall power consumption can be reduced.

The invention claimed is:

1. A half-bridge inverter for converting a DC input voltage to provide an AC output voltage at an output terminal (1001), the half-bridge inverter comprising:
   a first switching circuit (1100) connected to at least one input terminal (1002, 1004) and to the output terminal (1001), the first switching circuit (1100) configured to provide a high or a low voltage level at the output terminal (1001);
   a second switching circuit (1200) connected to the output terminal (1001), the second switching circuit (1200) configured to provide a connection to an intermediate voltage level, the intermediate voltage level being between the high and the low voltage level; and wherein
   the second switching circuit (1200) is further connected to the at least one input terminal (1002, 1004) allowing the second switching circuit (1200) to provide the high or the low voltage level at the output terminal (1001); and wherein
   the first switching circuit (1100) is separately switchable from the second switching circuit (1200);
   wherein the first switching circuit (1100) comprises a first switching element (1101) connected to one of the at least one input terminal (1002, 1004) and to the output terminal (1001) and a second switching element (1102) connected to another of the at least one input terminal (1004, 1002) and the output terminal (1001).

2. The half-bridge inverter according to claim 1, wherein the second switching circuit (1200) is further connected to an intermediate voltage level terminal (1003), the intermediate voltage level terminal (1003) configured to provide the intermediate voltage level; and wherein the second switching circuit (1200) further comprises:
   at least one third switching circuit (1210, 1220) connected to the at least one input terminal (1002, 1004) and to at least one internal node (1005, 1006), the third switching circuit (1210, 1220) being configured to provide the high or the low voltage level from the at least one input terminal (1002, 1004) to the at least one internal node (1005, 1006), and at least one first switching element (1201, 1202) configured to control providing the intermediate voltage level from the intermediate voltage level terminal (1003) and the high or the low voltage level from the at least one internal node (1005, 1006) at the output terminal (1001).

3. The half-bridge inverter according to claim 2, the second switching circuit (1200) further comprising at least one first diode (1203, 1204) connected between the intermediate voltage level terminal (1203) and the at least one internal node (1005, 1006), the at least one first diode (1203, 1204) being configured to block current from flowing between the at least one input terminal (1002, 1004) and the intermediate voltage level terminal (1003).

4. The half-bridge inverter according to claim 2, wherein the at least one third switching circuit (1210, 1220) comprises a metal oxide semiconductor field-effect transistor (1211, 1221) connected to the at least one input terminal and to the at least one internal node (1005, 1006).

5. The half-bridge inverter according to claim 2, wherein the at least one first switching element (1201, 1202) is an insulated gate bipolar transistor.

6. The half-bridge inverter according to claim 2, wherein the at least one third switching circuit (1210, 1220) comprises a series circuit of a second diode (2212, 2222) and a metal oxide semiconductor field-effect transistor (1211, 1221), and wherein the first switching element (1201, 1202) is a metal oxide semiconductor field-effect transistor.

7. The half-bridge inverter according to claim 2, the half-bridge inverter comprising two input terminals (1002, 1004) for receiving the high voltage level and the low voltage level as the DC input voltage, wherein each of the two input terminals (1002, 1004) is connected via a capacitor to the intermediate voltage level terminal (1003).

8. The half-bridge inverter according to claim 7, wherein the first switching circuit (1100) is configured to provide an AC output voltage from the high and the low voltage level by alternately switching a connection between one of the two input terminals (1002, 1004) and the output terminal (1001).

9. The half-bridge inverter according to claim 2, wherein the first switching element (1201, 1202) includes a transistor (1201, 1202) with a transistor rating of at least a voltage level corresponding to the difference between the voltage level at the at least one input terminal (1002, 1004) and at the intermediate voltage level terminal (1003).

10. The half-bridge inverter according to claim 1, wherein the first switching circuit (1100) comprises at least one insulated gate bipolar transistor (1101, 1102) and the second switching circuit comprises at least one metal oxide semiconductor field-effect transistor (1211, 1221).

11. The half-bridge inverter according to claim 1, the second switching circuit (1200) further comprising at least one reverse blocking insulated gate bipolar transistor (2205) connecting the intermediate voltage level terminal (1003) and the output terminal (1001) in parallel with the at least one first diode (1203, 1204) and the at least one first switching element (1201, 1202).

12. The half-bridge inverter according to claim 1, wherein the first switching circuit (1100) includes at least one cascode of an emitter switched bipolar transistor (3111, 3121) and of an metal oxide semiconductor field-effect transistor (3112, 3122), the at least one cascode being connected between the at least one input terminal (1002, 1004) and the output terminal for providing the high or the low voltage level at the output terminal (1001); and wherein the second switching circuit (1200) further comprises at least one second switching element (3201, 3202) connected between the at least one internal node (1005, 1006) and the base of the emitter switched bipolar transistor (3111, 3121) for controlling the provision of the high or the low voltage level by the at least one cascode at the output terminal (1001).

13. The half-bridge inverter according to claim 12, wherein the at least one first switching element (2201, 2202) is either a metal oxide semiconductor field-effect transistor or a insulated gate bipolar transistor, the at least one third switching circuit (1210, 1220) comprises a metal oxide semiconductor field-effect or an insulated gate bipolar transistor (1211, 1221) connected to the at least one input terminal and to the at least one internal node (1005, 1006), and the at least one second switching element (3201, 3202) is a metal oxide semiconductor field-effect transistor.

14. A driving method for a half-bridge inverter according to claim 12 comprising the steps of:
a) turning on the first switching element (2201, 2202) and remaining the first switching element (2201, 2202) turned on for the period of providing the positive or negative half wave;
b) turning on the third switching circuit (1210, 1220) enabling the DC input voltage from the at least one input terminal (1002, 1004) to be conducted via the third switching circuit (1210, 1220) and first switching element (2201, 2202) to the output terminal (1001);
c) turning on the at least one second switching element (3201, 3202) and the metal oxide semiconductor field-effect transistor (3112, 3122).

15. The half-bridge inverter according to claim 1, wherein the first switching circuit (1100) includes at least one transistor (1101, 1102) with a transistor rating of at least the DC input voltage level, and the second switching circuit (1200) includes at least one transistor (1211, 1221) with a transistor rating of at least a voltage level corresponding to the difference between the voltage level at the at least one input terminal (1002, 1004) and the intermediate voltage level terminal (1003).

* * * * *